United States Patent
Minemura et al.

(10) Patent No.: US 8,080,627 B2
(45) Date of Patent: Dec. 20, 2011

(54) POLYCARBONATE RESIN, PROCESS FOR PRODUCING THE SAME AND ELECTROPHOTOGRAPHIC PHOTORECEPTOR USING THE SAME

(75) Inventors: Masahiko Minemura, Annaka (JP); Noriyoshi Ogawa, Kamisu (JP)

(73) Assignees: Shin-Etsu Chemical Co., Ltd., Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 981 days.

(21) Appl. No.: 12/068,924

(22) Filed: Feb. 13, 2008

(65) Prior Publication Data
US 2008/0199796 A1  Aug. 21, 2008

(30) Foreign Application Priority Data
Feb. 15, 2007  (JP) ................. 2007-035456

(51) Int. Cl.
*C08G 64/00* (2006.01)
*C08G 63/02* (2006.01)
(52) U.S. Cl. ......... 528/196; 430/59.5; 430/64; 430/134; 528/26; 528/33
(58) Field of Classification Search ................. 430/59.5, 430/64, 134; 528/26, 33
See application file for complete search history.

(56) References Cited

U.S. PATENT DOCUMENTS
5,254,423 A   10/1993   Mayama et al.

FOREIGN PATENT DOCUMENTS
| JP | 05-158249 | 6/1993 |
| JP | 05158249 | 6/1993 |
| JP | 05-297620 | 11/1993 |
| JP | 07261442 | 10/1995 |
| JP | 11316466 | 11/1999 |

OTHER PUBLICATIONS

Extended European Search Report (EESR) issued May 19, 2008 in connection with EP 08 00 2691 corresponding to the present U.S. application.

*Primary Examiner* — Terressa Boykin
(74) *Attorney, Agent, or Firm* — Wenderoth, Lind & Ponack, L.L.P.

(57) ABSTRACT

The present invention provides an electrophotographic photoreceptor having excellent lubricity and abrasion resistance by using a novel polycarbonate resin comprising structural units having a polysiloxane chain in the shape of grafts as represented by the following general formula (1) with a viscosity-average molecular weight of 12,000 to 100,000 as a binder resin for a charge transport layer of a electrophotographic photoreceptor.

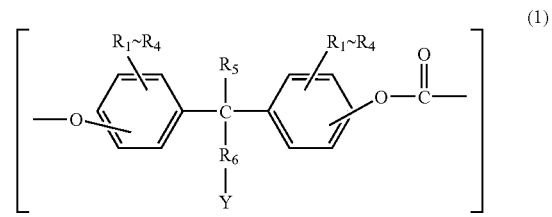

(1)

wherein $R_1$ to $R_5$ each independently represents hydrogen, fluorine, chlorine, bromine, iodine, an alkyl group, an aryl group, an alkoxy group or an aralkyl group. $R_6$ represents an alkylene group. Y represents a polysiloxane chain.

17 Claims, No Drawings

POLYCARBONATE RESIN, PROCESS FOR PRODUCING THE SAME AND ELECTROPHOTOGRAPHIC PHOTORECEPTOR USING THE SAME

BACKGROUND OF THE INVENTION

1) Field of the Invention

The present invention relates to a novel polycarbonate resin having a polysiloxane group in a side chain and an electrophotographic photoreceptor using the same as a binder resin of a charge transport layer thereof.

2) Description of the Related Art

Large portion of polycarbonate resins currently produced is a bisphenol A-type polycarbonate resin using 2,2-bis(4-hydroxyphenyl)propane as a raw material. The bisphenol A-type polycarbonate resin is well-balanced in cost, heat resistance, mechanical strength and the like. However, based upon the expansion in application for polycarbonate, various polycarbonate resins having superior structures are developed. Among them, a particular polycarbonate resin is used as a binder resin of a charge transport layer of an electrophotographic photoreceptor. Especially, polysiloxane copolymerized-polycarbonate resins are known as a binder resin excellent in lubricity and abrasion resistance (see Jpn. Pat. Appln. Laid-Open Publications No. H05-297620 and H05-158249).

Lubricity and abrasion resistance are improved actually by using these conventional polysiloxane copolymerized-polycarbonate resins. However, freedom of polysiloxane is restricted in connection with the bond position between a polysiloxane segment and a main chain of polycarbonate. Therefore, the function of polysiloxane is not necessarily brought out sufficiently and hence requires improvements.

SUMMARY OF THE INVENTION

The object of the present invention is to provide a novel polycarbonate resin having polysiloxane groups as a graft and an electrophotographic photoreceptor excellent in abrasion resistance using the polycarbonate resin as a binder resin of a charge transport layer.

The inventors of the present invention paid intensive research efforts to solve the above problems and, as a result, have found that a polycarbonate resin having polysiloxane chains bonded with the main chain of polycarbonate through alkylene groups exhibits excellent lubricity and abrasion resistance and is suitable as a binder resin for an electrophotographic photoreceptor. The present invention is based on this finding.

Thus, the present invention relates to a polycarbonate resin, a process for producing the same and an electrophotographic photoreceptor using the same shown below.

(1) A polycarbonate resin having a viscosity-average molecular weight of 12,000 to 100,000 which is composed mainly by a structural unit represented by the following general formula (1) and a structural unit represented by the following general formula (2):

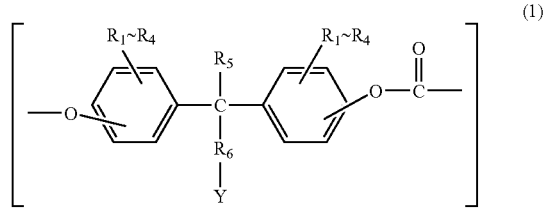

(wherein $R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. $R_6$ represents an alkylene group having 1 to 20 carbon atoms which may have substituents. Y represents a group selected from the following groups:

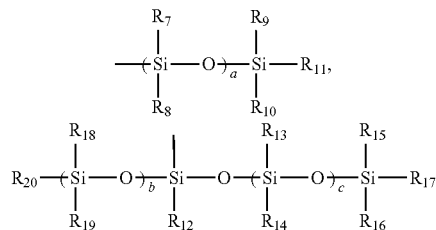

wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. "a", "b" and "c" each represents an integer of not less than 1.)

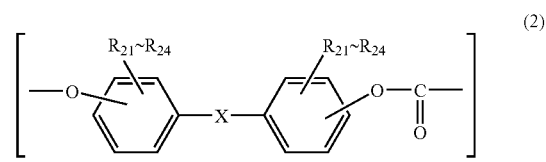

(wherein $R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents. X represents a group selected from the following groups:

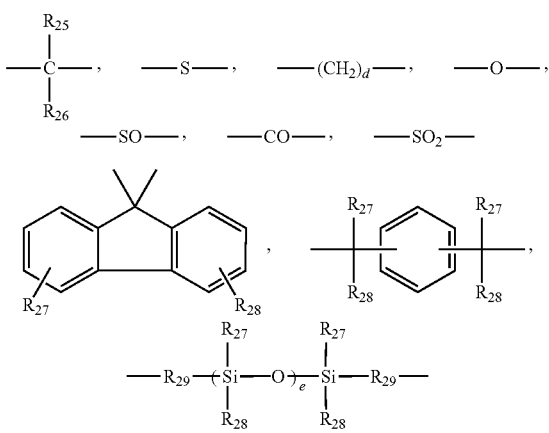

wherein $R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements. $R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents. $R_{29}$ represents an alkylene group having 1 to 9 carbon atoms which may have substituents. "d" represents an integer of 0 to 20. "e" represents an integer of 1 to 500.)

(2) The polycarbonate resin according to (1), wherein $R_6$ in the general formula (1) represents an alkylene group having 3 to 20 carbon atoms.

(3) The polycarbonate resin according to (1) or (2), wherein "a", "b", and "c" in the general formula (1) each represents an integer of 1 to 200.

(4) The polycarbonate resin according to any one of (1) to (3), wherein $R_7$ to $R_{20}$ in the general formula (1) each represents a methyl group or a phenyl group.

(5) The polycarbonate resin according to any one of (1) to (4), wherein $R_1$ to $R_4$ in the general formula (1) each represents a group selected from the group consisting of hydrogen, a methyl group, a butyl group and a phenyl group.

(6) The polycarbonate resin according to any one of (1) to (5), wherein the ratio of the structural unit represented by the formula (1) and the structural unit represented by the formula (2) is (1):(2)=0.1-70:99.9-30 in a weight ratio.

(7) A process for producing the polycarbonate resin according to any one of (1) to (6), which comprises a step of reacting bisphenol represented by the following general formula (140) and bisphenol represented by the following general formula (2') with a carbonate-forming compound.

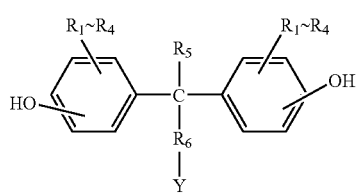
(1')

(wherein $R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. $R_6$ represents an alkylene group having 1 to 20 carbon atoms which may have substituents. Y represents a group selected from the following groups:

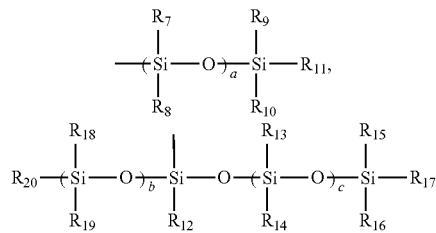

wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. "a", "b", and "c" each represents an integer of not less than 1.)

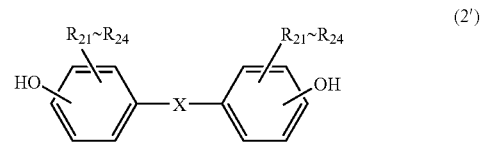
(2')

(wherein $R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents. X represents a group selected from the following groups:

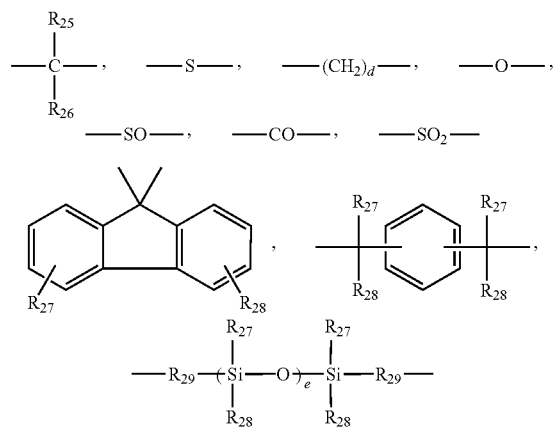

wherein $R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements. $R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents. $R_{29}$ represents an alkylene group having 1 to 9 carbon atoms which may have substituents. "d" represents an integer of 0 to 20. "e" represents an integer of 1 to 500.)

(8) The process for producing a polycarbonate resin according to (7), wherein said bisphenol represented by the general formula (1') is selected from the group consisting of the compounds represented by following structures:

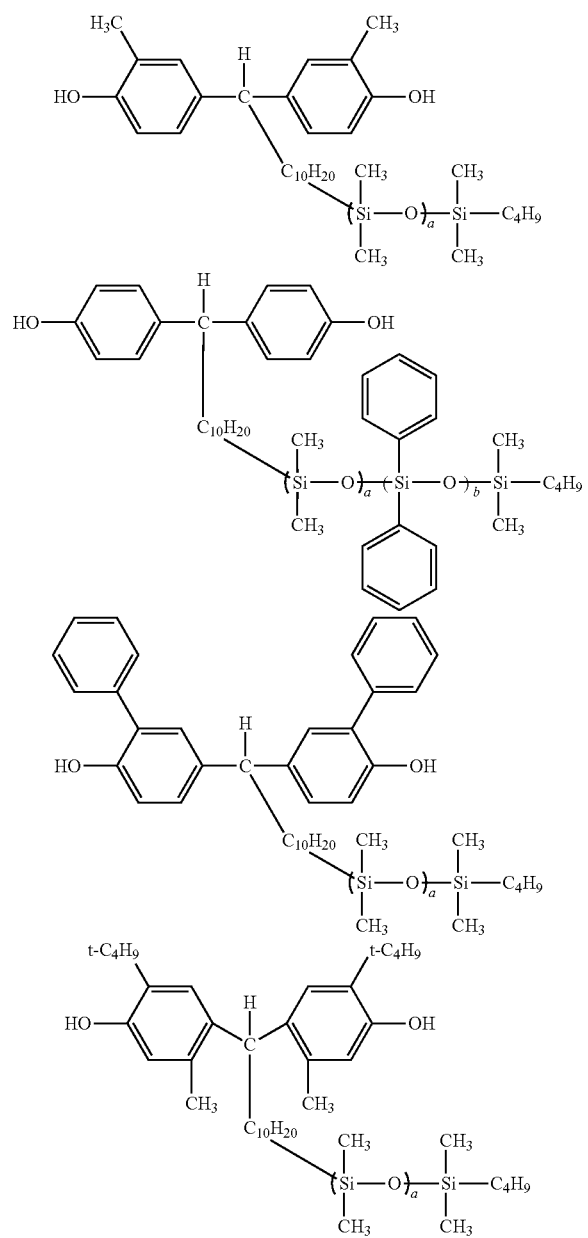

(9) The process for producing a polycarbonate resin according to (7) or (8), wherein said bisphenol represented by the general formula (2') is selected from the group consisting of 2,2-bis(4-hydroxyphenyl)propane, 2,2-bis(4-hydroxy-3-methylphenyl) propane, bis(4-hydroxyphenyl)ether, 1,1-bis(4-hydroxyphenyl)cyclohexane, 1,1-bis(4-hydroxyphenyl)-1-phenylethane, 1,1-bis(4-hydroxyphenyl)ethane, and 1,1'-biphenyl-4,4'-diol.

(10) The process for producing a polycarbonate resin according to any one of (7) to (9), wherein said carbonate-forming compound is phosgene.

(11) The process for producing a polycarbonate resin according to any one of (7) to (10), wherein the proportion of the bisphenol represented by the general formula (1') is 0.1 to 60% by weight based upon the total amount of bisphenol used.

(12) An electrophotographic photoreceptor using the polycarbonate resin according to any one of (1) to (6) as a binder resin of a charge transport layer thereof.

The polycarbonate resin according to the present invention is a novel polycarbonate having polysiloxane segments extended from the main chain through alkylene groups and is excellent in lubricity and abrasion resistance compared with the conventional polycarbonates having polysiloxane segments.

When using such a polycarbonate resin of the present invention having high abrasion resistance compared with the conventional arts, abrasion of the photoreceptor of a copying machine or a printing machine can be reduced to prolong the service life of the photoreceptor and reduce the frequency of servicing operation.

DETAILED DESCRIPTION OF THE INVENTION

1. Polycarbonate Resin

The polycarbonate resin according to the present invention contains structural units represented by the general formula (1) (to be referred to as a "structural unit (1)" hereinafter) and structural units represented by the general formula (2) (to be referred to as "structural unit (2)" hereinafter).

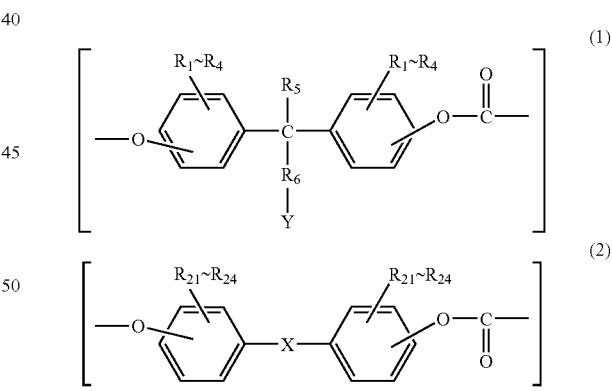

In the above formula (1), $R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. Preferably, $R_1$ to $R_4$ each independently represents a group selected from the group consisting of hydrogen, a methyl group, a butyl group and a phenyl group. $R_5$ preferably represents hydrogen or a methyl group.

$R_6$ represents an alkylene group having 1 to 20 carbon atoms which may have substituents. Preferably, $R_6$ represents an alkylene group having 3 to 20 carbon atoms which may have substituents. Most preferably, $R_6$ represents an alkylene group having 8 to 12 carbon atoms. When the number of carbon atoms of $R_6$ is too large, thermal resistance may be deteriorated. When the number of carbon atoms of $R_6$ is too small, function of polysiloxane may not be exhibited sufficiently because the freedom of polysiloxane chains is restricted.

Y represents a group selected from the following groups, wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents.

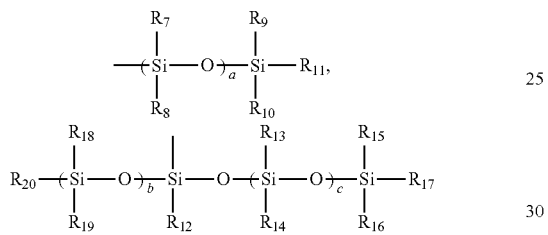

Most preferably, $R_7$ to $R_{20}$ each independently represents a methyl group or a phenyl group. "a", "b", and "c" each represents an integer of not less than 1, preferably an integer of 1 to 200, more preferably an integer of 5 to 100. The average polymerization degree of "a" per structural unit (1) is preferably in the range of 1 to 500, more preferably in the range of 1 to 100. The total average polymerization degree of "b" and "c" per structural unit (1) is preferably in the range of 1 to 500, more preferably in the range of 1 to 100. These units of a polysiloxane segment may be bonded mutually in the form of a random copolymerization or a block copolymerization.

Examples of the structural unit (1) include residual groups of the following bisphenol compounds:

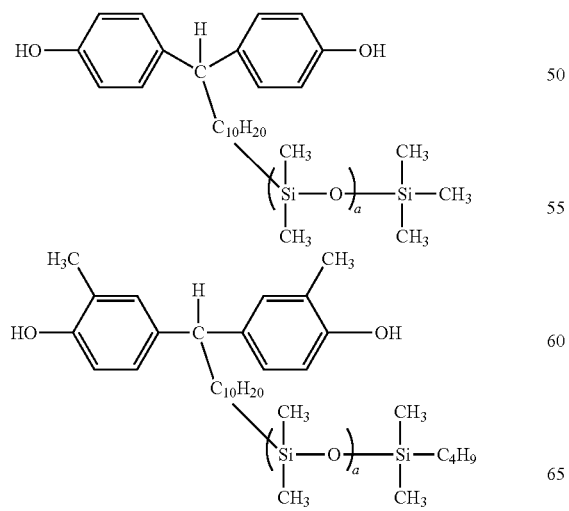

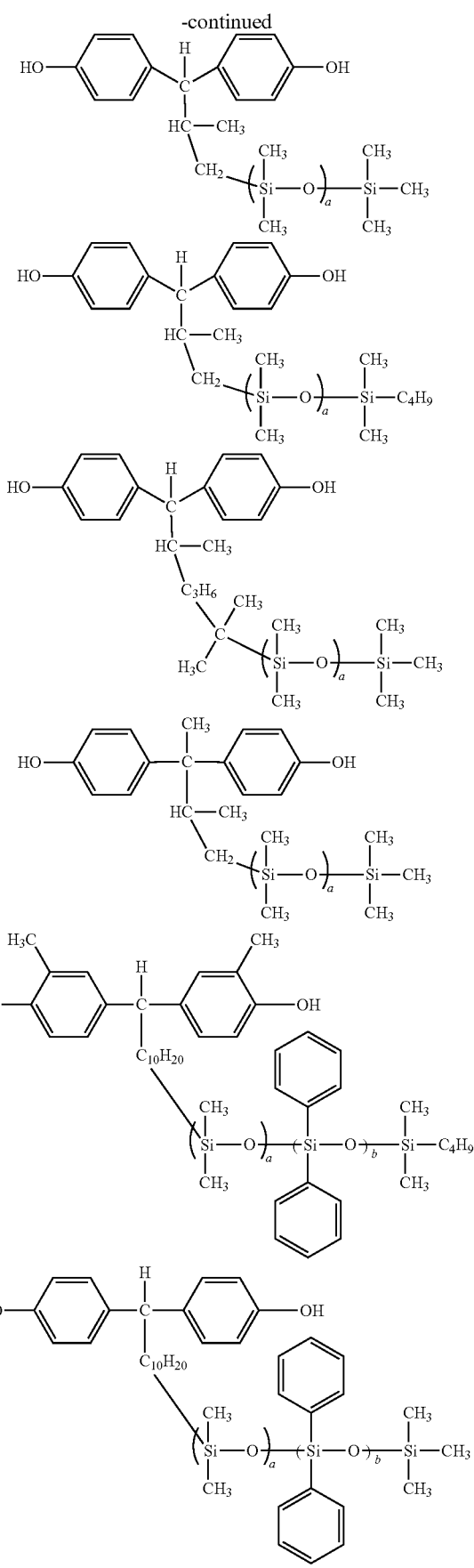

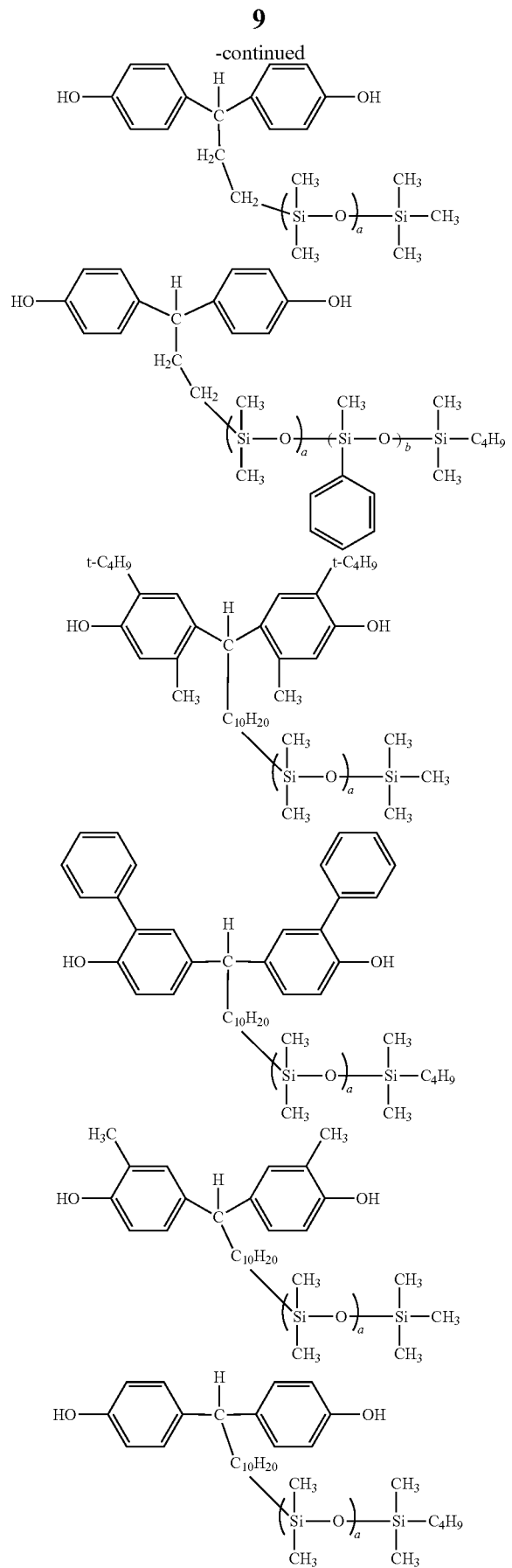
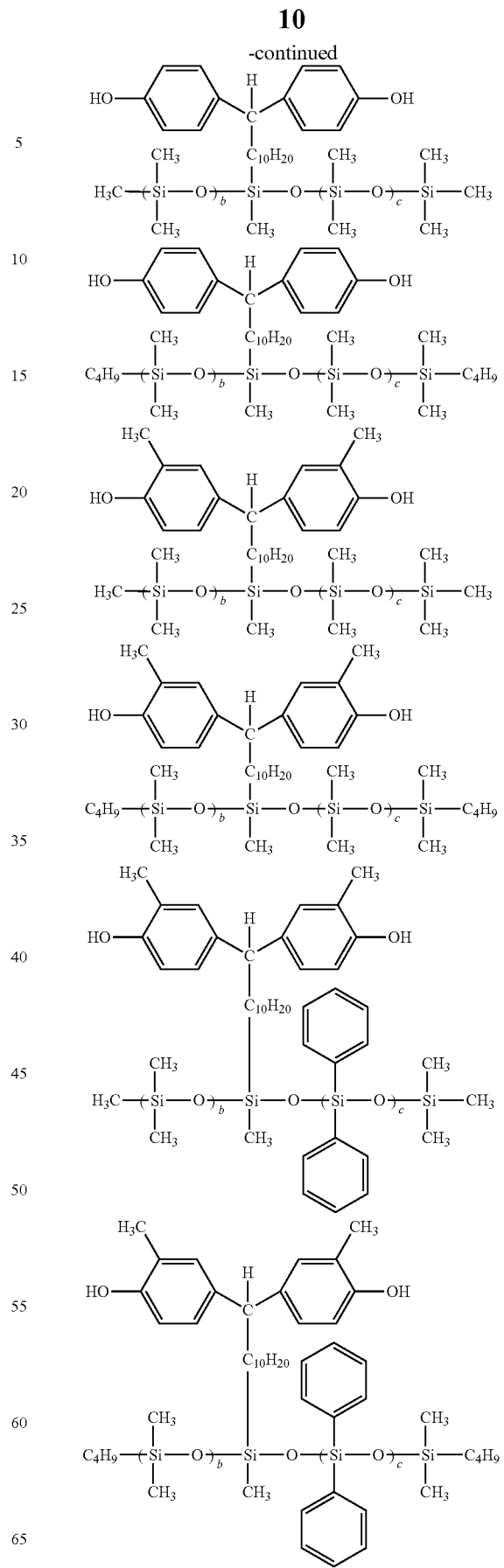

-continued

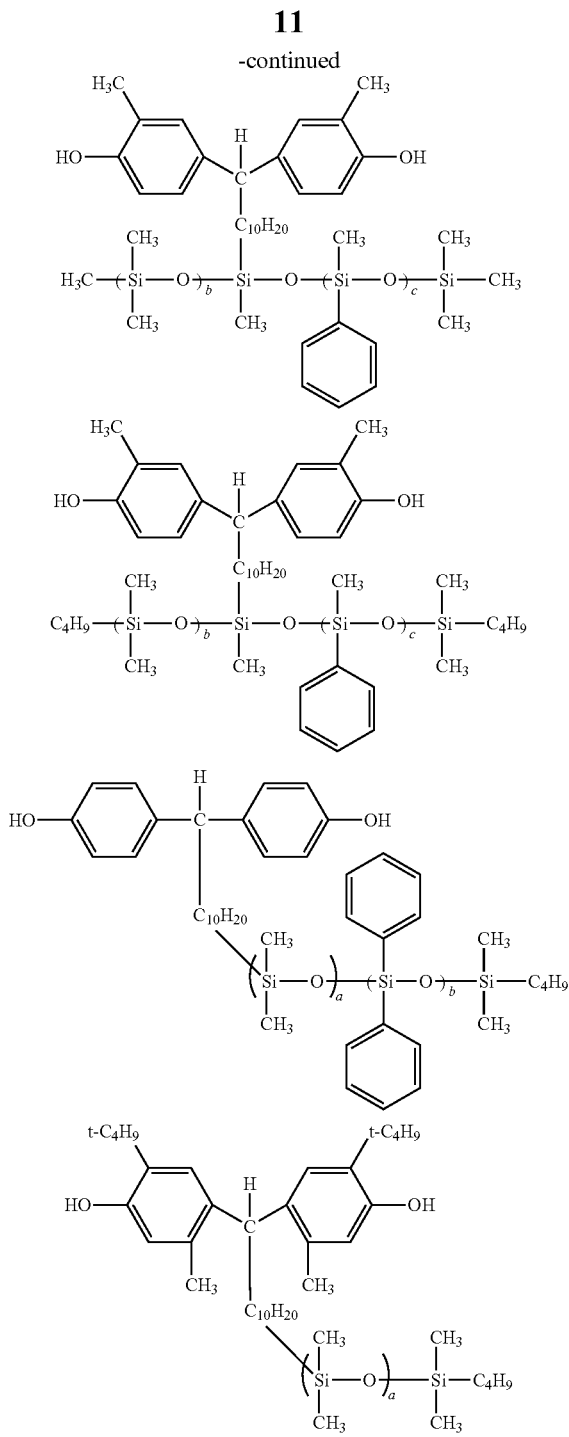

Among them, the most preferable ones are the residual groups of the following bisphenol compounds:

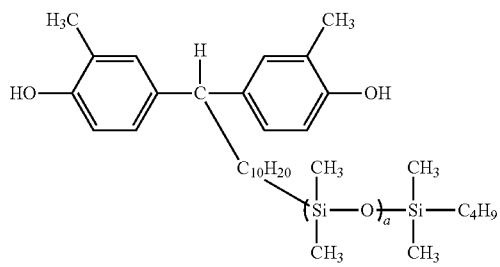

-continued

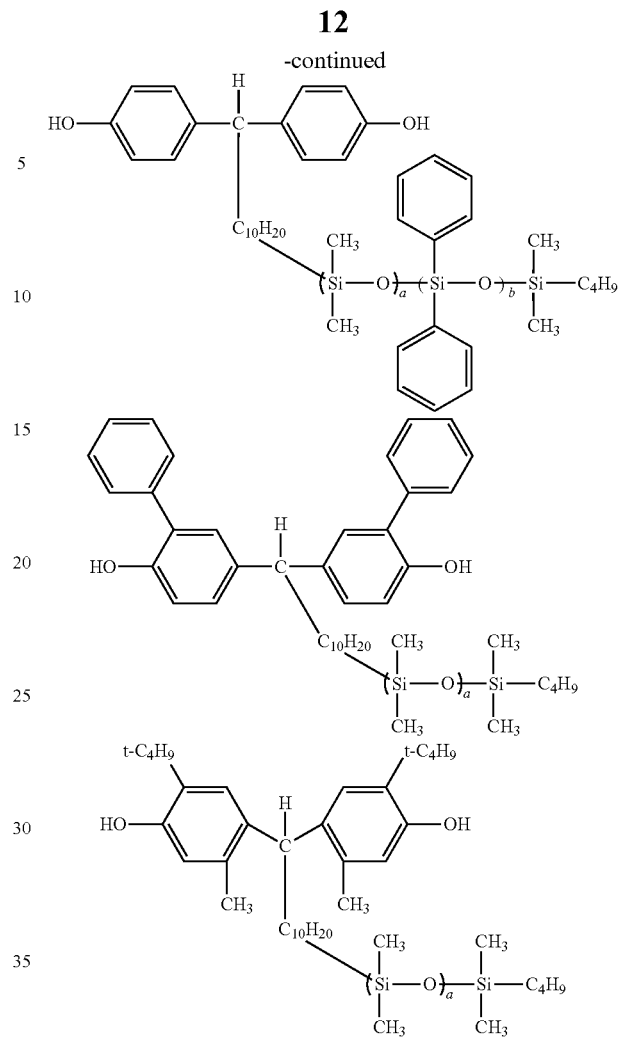

In the general formula (2), $R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents. Preferably, $R_{21}$ to $R_{24}$ each independently represents a group selected from the group consisting of hydrogen, a methyl group, a butyl group and a phenyl group. X represents a group selected from the following groups:

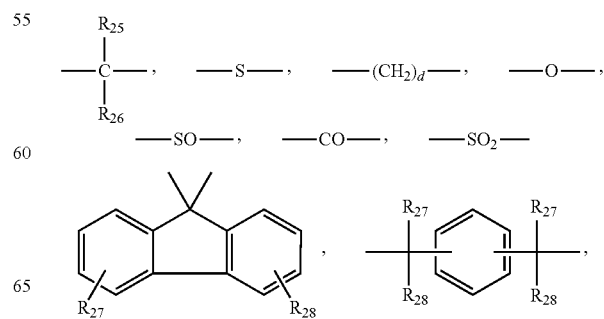

-continued

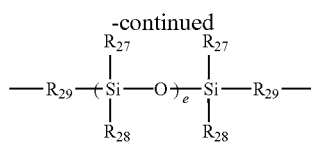

In the above formulas, $R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements. Suitable examples of $R_{25}$ and $R_{26}$ include hydrogen, a methyl group, a phenyl group and a cyclohexylidene wherein $R_{25}$ and $R_{26}$ are combined.

$R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents. Suitable examples of $R_{27}$ and $R_{28}$ include hydrogen, a methyl group, an ethyl group and a phenyl group.

$R_{29}$ represents an alkylene group having 1 to 9 carbon atoms which may have substituents, preferably an alkylene group having 2 to 5 carbon atoms. "d" represents an integer of 0 to 20, preferably 0 to 7. "e" represents an integer of 1 to 500, preferably 1 to 100.

Examples of the structural unit (2) include residual groups of 1,1'-biphenyl-4,4'-diol, bis(4-hydroxyphenyl)methane, 1,1-bis(4-hydroxyphenyl)ethane, bis(4-hydroxyphenyl) ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 1,1-bis(4-hydroxyphenyl)cyclododecane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, and 4,4'-[1,3-phenylene-bis(1-methylethylidene)]bisphenol.

Among them, most suitable examples include the residual group of a bisphenol compound selected from the group consisting of 2,2-bis(4-hydroxyphenyl)propane, 2,2-bis(4-hydroxy-3-methylphenyl)propane, bis(4-hydroxyphenyl) ether, 1,1-bis(4-hydroxyphenyl)cyclohexane, 1,1-bis(4-hydroxyphenyl)-1-phenylethane, 1,1-bis(4-hydroxyphenyl)ethane, and 1,1'-biphenyl-4,4'-diol.

The carbonate resin of the present invention is a copolymer wherein the structural units represented by the above general formula (1) and the structural units represented by the above general formula (2) are randomly bonded, which has a viscosity-average molecular weight of 12,000 to 100,000, preferably 15,000 to 80,000. When the viscosity-average molecular weight is outside the above range, an electrophotographic photoreceptor having sufficient film-forming property and film strength may not be obtained.

The ratio of the structural unit (1) and the structural unit (2) is not limited. However, it is preferable that [the structural unit (1)]:[the structural unit (2)]=0.1-70:99.9:30 in a weight ratio, more preferably 1-50:99:50 in a weight ratio. When the amount of the structural unit (1) having a polysiloxane chain in its side chain is too small, the effect of surface modification may be deteriorated. When the amount of the structural unit (1) is too large, the thermal resistance may be deteriorated.

The polycarbonate resin of the present invention can be molded by way of a known molding method such as a wet molding, an extrusion molding, a compression molding an inflation molding and an injection molding. Especially, in the case of using for manufacturing an electrophotographic photoreceptor, the polycarbonate resin of the present invention can be molded with ease by way of a known wet molding such as a solution casting method, a casting method, a spray coating method or a dip coating method. In order to obtain an electrophotographic photoreceptor having satisfactory film-forming property and film strength by a wet molding, it is preferable to use a polycarbonate resin having the viscosity-average molecular weight in the above-mentioned range.

2. Process for Producing a Polycarbonate Resin

The polycarbonate resin of the present invention is produced by the process comprising a step of reacting bisphenol represented by the following general formula (1') and bisphenol represented by the following general formula (2') with a carbonate-forming compound.

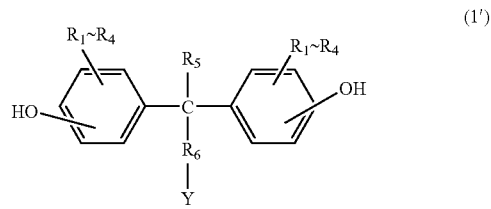

(1')

In the general formula (1'), $R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents. $R_6$ represents an alkylene group having 1 to 20 carbon atoms which may have substituents.

Preferably, $R_1$ to $R_4$ each independently represents a group selected from the group consisting of hydrogen, a methyl group, a butyl group and a phenyl group. $R_5$ preferably represents hydrogen or a methyl group.

$R_6$ represents preferably an alkylene group having 3 to 20 carbon atoms, most preferably an alkylene group having 8 to 12 carbon atoms. When the number of carbon atoms of $R_6$ is too large, thermal resistance may be deteriorated. When the number of carbon atoms of $R_6$ is too small, freedom of polysiloxane chains may be restricted.

Y represents a group selected from the polysiloxane chains represented by the following formulas, wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents.

"a", "b", and "c" each represents an integer of not less than 1, preferably an integer of 1 to 200, more preferably an integer of 5 to 100. The average polymerization degree of "a" per molecule is preferably in the range of 1 to 500, more preferably in the range of 1 to 100. The total average polymerization degree of "b" and "c" per molecule is preferably in the range of 1 to 500, more preferably in the range of 1 to 100.

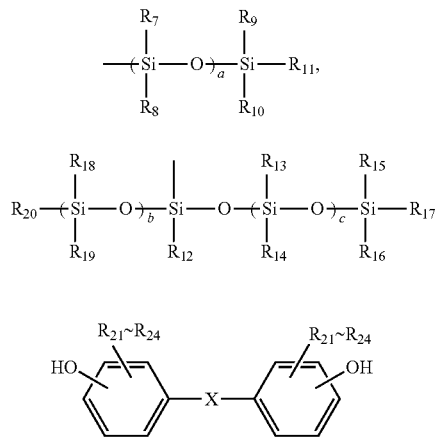

(2')

In the general formula (2'), $R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents. X represents a group selected from the following groups:

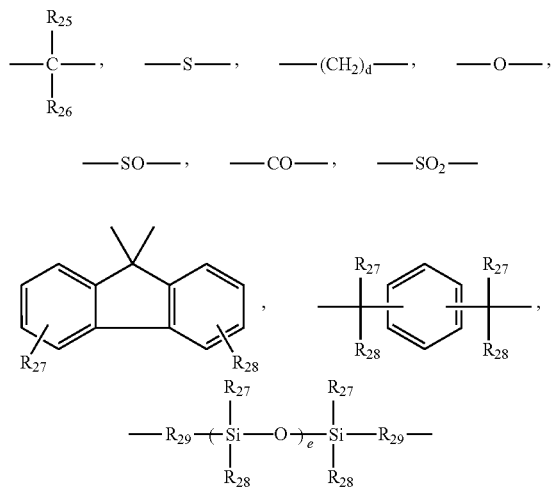

wherein $R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements. $R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents. $R_{29}$ represents an alkylene group having 1 to 9 carbon atoms which may have substituents. "d" represents an integer of 0 to 20. "e" represents an integer of 1 to 500.

For the process of producing a polycarbonate resin according to the present invention, any of the known methods for manufacturing polycarbonate from bisphenol A and a carbonate forming compound may be used. Examples of such methods include a direct reaction process of bisphenols and phosgene (a phosgene method) and an ester exchange reaction of bisphenols with bisarylcarbonates (a transesterification method).

Of the phosgene method and the transesterification method, the phosgene method is preferable from the viewpoint of flow stability of the bisphenol represented by the general formula (1'). From the viewpoint of the physical properties of the polycarbonate resin, it is preferable to use the bisphenol represented by the general formula (1') in the amount of 0.1 to 60% by weight, most preferably 1 to 50% by weight based upon the total amount of the bisphenols to be used as a raw material. When the ratio of the bisphenol represented by the general formula (1') is too low, the effect of surface modification by the carbonate resin of the present invention may not be exhibited sufficiently. When the ratio of the bisphenol represented by the general formula (1') is too high, thermal resistance may be deteriorated.

The bisphenol represented by the general formula (1') can be manufactured by hydrosilylation a bisphenol compound having an alkenyl group on a carbon atom positioned between two benzene rings with a polysiloxane having HSi group. Examples of the bisphenols represented by the general formula (1') are as follows, though not limited by them:

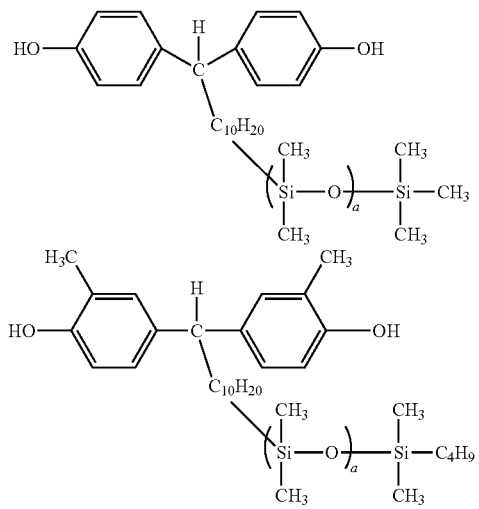

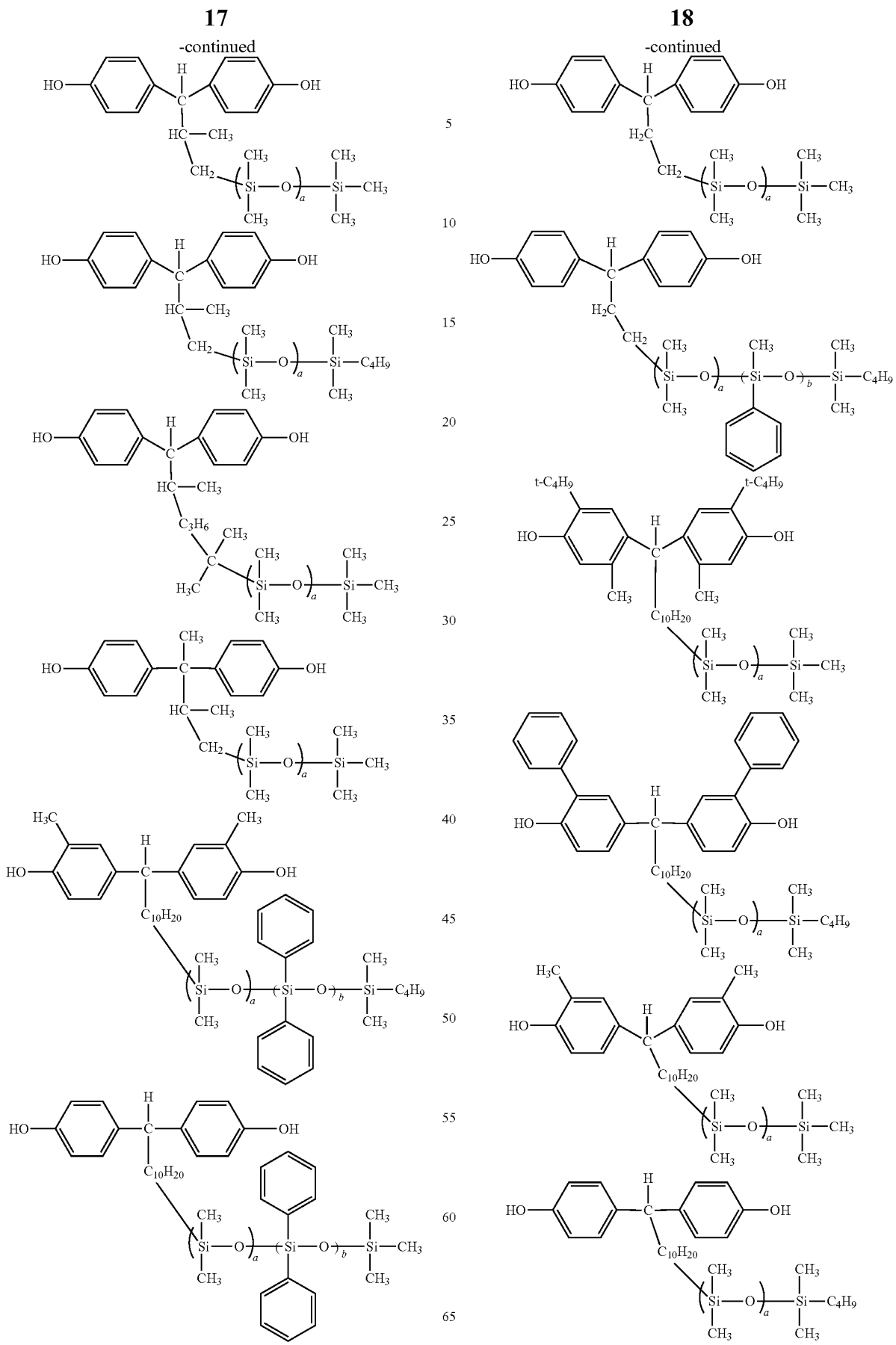

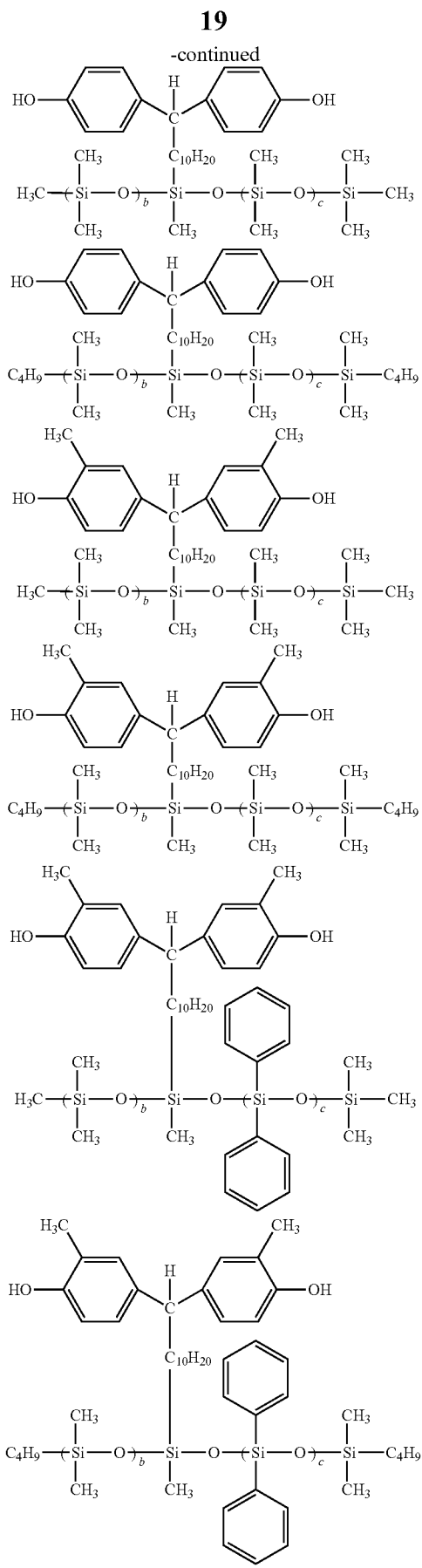
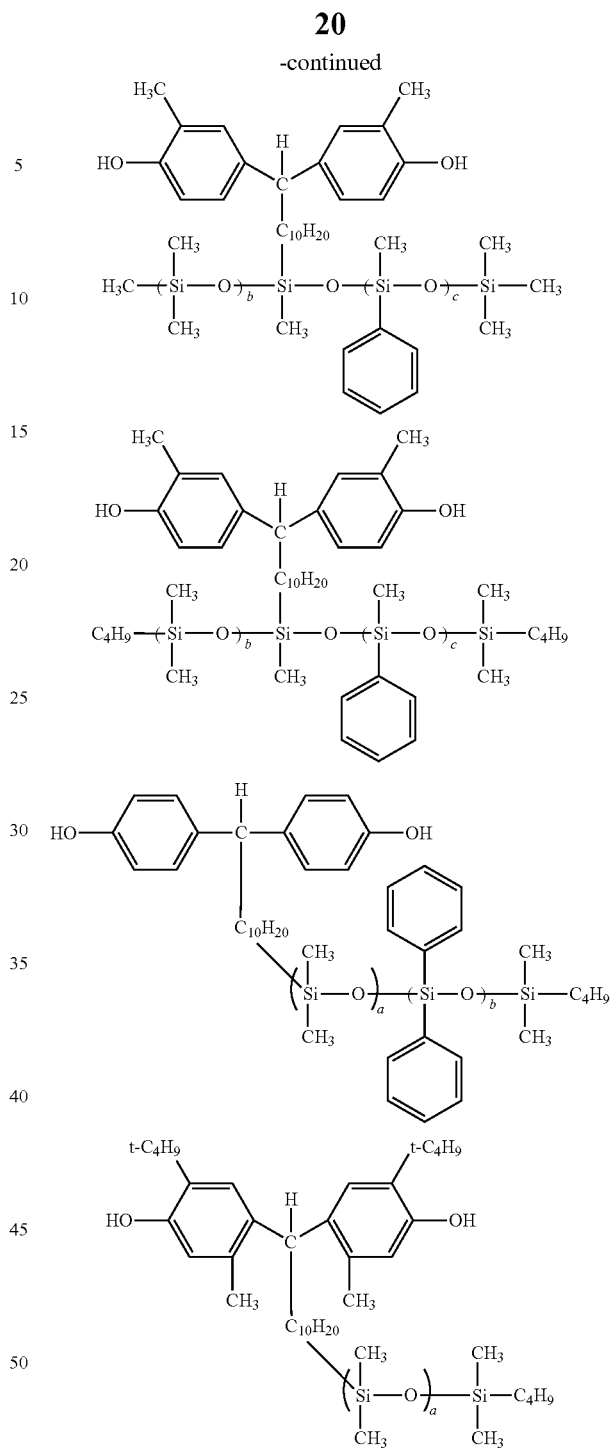
Among them, the most preferable ones are the following bisphenols:
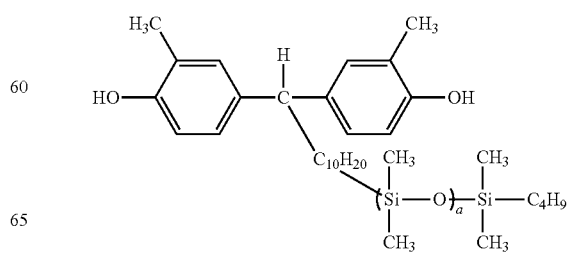

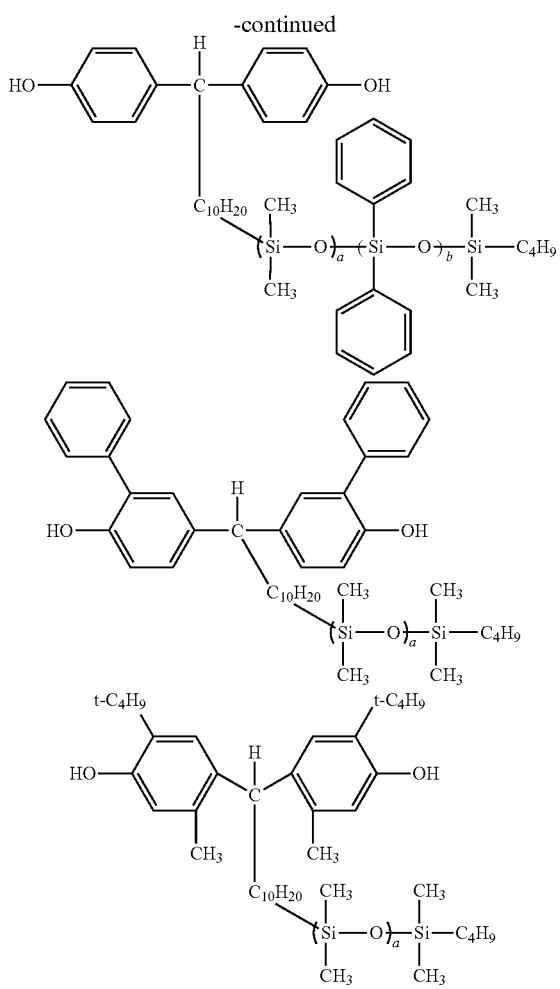

Two or more of these bisphenols can be used in combination. In the above chemical formulas, "a", "b", and "c" each preferably represents an integer of 1 to 200, more preferably 5 to 100. The repeating units of "a", "b", and "c" in the polysiloxane segments can be bonded mutually in the form of a random copolymerization or a block copolymerization. However, it is preferable to be bonded in the form of a random copolymerization.

Suitable examples of substituents in the siloxane units represented by $R_7$ to $R_{20}$ include a methyl group and a phenyl group. The average polymerization degree of "a" per molecule represented by the general formula (1') is preferably in the range of 1 to 500, more preferably in the range of 1 to 100. The total average polymerization degree of "b" and "c" per molecule represented by the general formula (1') is preferably in the range of 1 to 500, more preferably in the range of 1 to 100.

Examples of bisphenols represented by the general formula (2') include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 1,1-bis(4-hydroxyphenyl)cyclododecane, 2,2-bis(4-hydroxyphenyl)hexafluoropropane, bis(4-hydroxyphenyl) diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, and 4,4'-[1,3-phenylene-bis(1-methylethylidene)]bisphenol.

Among them, most suitable examples include a bisphenol compound selected from the group consisting of 2,2-bis(4-hydroxyphenyl)propane, 2,2-bis(4-hydroxy-3-methylphenyl)propane, bis(4-hydroxyphenyl)ether, 1,1-bis(4-hydroxyphenyl)cyclohexane, 1,1-bis(4-hydroxyphenyl)-1-phenylethane, 1,1-bis(4-hydroxyphenyl)ethane, and 1,1'-biphenyl-4,4'-diol.

Examples of carbonate forming compounds include phosgenes such as phosgene and triphosgene, and bisarylcarbonates such as diphenylcarbonate, di-p-tolylcarbonate, phenyl-p-tolylcarbonate, di-p-chlorophenylcarbonate, dinaphthylcarbonate and the like. Two or more of them can be used in combination with each other.

According to the phosgene method, under the presence of an acid coupling agent and a solvent in general, bisphenol represented by the general formula (1') and bisphenol represented by the general formula (2') can be brought into reaction with phosgene or bisphenol represented by the general formula (2') can be firstly reacted with phosgene to form a chloroformate and then be reacted with bisphenol represented by the general formula (1').

Examples of acid coupling agents include pyridine and hydroxides of alkali metals such as sodium hydroxide, potassium hydroxide and the like. Examples of solvents include methylene chloride, chloroform and monochlorobenzene.

In addition, for the purpose of accelerating the condensation polymerization reaction, it is preferable to add a catalyst such as a tertiary amine such as triethylamine or a quaternary ammonium salt into the reaction system. Moreover, it is also preferable to add monofunctional compounds such as phenol, p-t-butylphenol, p-cumylphenol, a long chain alkyl-substituted phenol, an olefin-substituted phenol and the like as a molecular weight adjuster for adjusting the degree of polymerization.

If desired, an antioxidant such as sodium sulfite and hydrosulfite and a branching agent such as fluoroglycin, isatin bisphenol and trisphenolethane can be added by a small amount. It is proper, in general, to conduct the reaction at a temperature range between 0 and 150° C., preferably between 5 and 40° C. While the reaction time may vary depending on the reaction temperature, it is normally between 0.5 minutes and 10 hours, preferably between 1 minute and 2 hours. It is desirable to keep the pH of the reaction system not lower than 10 during the reaction.

According to the transesterification method, bisphenol represented by the general formula (1'), bisphenol represented by the general formula (2') and bisarylcarbonate are mixed to react with each other at high temperature under reduced pressure.

The reaction is generally conducted at a temperature range between 150 and 350° C., preferably between 200 and 300° C. The ultimate pressure is preferably reduced to 1 mmHg or less so that the phenols derived from the bisarylcarbonate which are produced as a result of the transesterification method can be removed from the reaction system by distillation.

While the reaction time varies depending on the reaction temperature and the reduced pressure level, it is generally 1 to 24 hours. The reaction is preferably conducted in an atmosphere of inert gas such as nitrogen or argon. If desired, the reaction can be conducted by adding a molecular weight adjuster, an antioxidant and/or a branching agent.

The polycarbonate resin synthesized from the above methods can be molded by way of a known molding method such as a wet molding, an extrusion molding, a compression molding an inflation molding and an injection molding. Especially, in the case of using for manufacturing an electrophotographic photoreceptor, the polycarbonate resin of the present invention can be molded with ease by way of a known wet molding such as a solution casting method, a casting method, a spray coating method or a dip coating method. In order to obtain an electrophotographic photoreceptor having satisfactory film strength by a wet molding, it is preferable to use a polycarbonate resin having the viscosity-average molecular weight in the range of 12,000 to 100,000. Further considering of importance of film-forming properties and film strength, it is preferable to use a polycarbonate resin having the viscosity-average molecular weight in the range of 15,000 to 80,000.

3. Electrophotographic Photoreceptor

The electrophotographic photoreceptor according to the present invention has a photoconductive layer that may be a single layer or a functionally separated multilayer formed on a conductive support. It is preferable that a multilayer type electrophotographic photoreceptor having a charge generating layer and a charge transport layer. If necessary, an underlying layer, a protection layer and/or an adhesive layer can be added.

The conductive support to be used in the present invention can be made of a metal material such as aluminum, stainless steel and nickel, or a polyester film, a phenol resin film or paper having an electrically conductive layer of aluminum, palladium, tin oxide, indium oxide and the like on the surface thereof. The conductive support can be formed in any shape such as a cylindrical shape or a belt shape suitable for transferring toner.

The charge generating layer for the purpose of the present invention is formed on a conductive support by means of a known method. Examples of charge generating materials to be used in the present invention include organic pigments of azoxybenzenes, disazo compounds, trisazo compounds, benzimidazoles, polycyclic quinolines, indigoids, quinacridones, phthalocyanines, perylenes and methines. Micro particles of any of these charge generating materials are dispersed in a binder resin. Examples of the binder resins to be used include a polyvinyl butyral resin, a polyvinyl formal resin, a silicon resin, a polyamide resin, a polyester resin, a polystyrene resin, a polycarbonate resin, a polyvinyl acetate resin, a polyurethane resin, a phenoxy resin, an epoxy resin and various celluloses.

The charge transport layer is formed on a charge generating layer by dispersing a charge transport material in the polycarbonate resin of the present invention as a binder resin by means of a known method. Examples of charge transport materials to be used in the present invention include, polytetracyanoethylene, fluorenone compounds such as 2,4,7-trinitro-9-fluorenone, nitro compounds such as dinitroanthracene, succinic anhydride, maleic anhydride, dibromo maleic anhydride, triphenylmethane compounds, oxadiazole compounds such as 2, 5-di(4-dimethylaminophenyl)-1,3,4-oxadiazole, styryl compounds such as 9-(4-diethylaminostyryl)anthracene, stilbene compounds such as 4-(2,2-bisphenyl-ethene-1-il)triphenylamine and 4-(2,2-bisphenyl-ethen-1-yl)-4',4"-dimethyltriphenylamine, carbazole compounds such as triphenylamine-poly(N-vinylcarbazole), pyrazoline compounds such as 1-phenyl-3-(p-dimethylaminophenyl) pyrazoline, amine derivatives such as 4,4',4"-tris(N,N-diphenylamino)triphenylamine and N,N'-bis(3-methylphenyl)-N, N'-bis(phenyl)benzidine, conjugated unsaturated compounds such as 1,1-bis(4-diethylaminophenyl)-4,4-diphenyl-1,3-butadiene, hydrazone compounds such as 4-(N,N-diethylamino)benzaldehyde-N,N-diphenylhydrazaone, nitrogen-containing cyclic compounds such as indole compounds, oxazole compounds, isooxazole compounds, thiazole compounds, thiadiazole compounds, imidazole compounds, pyrazole compounds, pyrazoline compounds and triazole compounds, and condensed polycyclic compounds. Any of the above listed charge transport materials can be used independently or in combination of two or more of them with each other.

The charge generating layer and the charge transport layer can be formed by dissolving a charge generating material or a charge transport material with a binder resin into a suitable solution respectively and then coating the solution by means of a solution casting method, a casting method, a spray coating method, a dip coating method and the like, and subsequently drying it. Solvents to be used can be roughly classified into halogen type organic solvents and non-halogen type organic solvents.

Examples of non-halogen type solvents include aromatic hydrocarbons such as toluene and xylene, ketones such as acetone, methylethylketone, cyclohexanone and isophoron, ethers such as tetrahydrofuran, 1,4-dioxane, ethylene glycol diethyl ether and ethylcellosolve, esters such as methyl acetate and ethyl acetate as well as dimethyl formamide, dimethyl sulfoxide and diethyl formamide. Examples of halogen type solvents include dichloromethane, chloroform, monochlorobenzene, 1,1,1-trichloroethane, monochloroethane and carbon tetrachloride. For the purpose of the present invention, any of the above-listed solvents may be used independently or in combination of two or more of them with each other. When dissolving the binder resin of the present invention into a solvent to form a charge transport layer, it is preferable to prepare a binder resin solution containing the binder resin within a range between 1 and 40% by weight for use. It is also possible to recycle used electrophotographic photoreceptors commercially available by dissolving the charge transport layers of said used electrophotographic photoreceptors with a solvent selected from the above listed ones to remove and then forming a new charge transport layer thereon.

The mixing ratio of the charge generating material and the binder resin is preferably within a range between 10:1 and 1:20. The preferable thickness of the charge generating layer is 0.01 to 20 µm, more preferably 0.1 to 2 µm. The mixing ratio of the charge transport material and the binder resin is preferably within a range between 10:1 and 1:10. The preferable thickness of the charge transport layer is 2 to 100 µm, more preferably 5 to 40 µm.

The polycarbonate resin of the present invention can be used by blending with other binder resins for the charge transport layer such as other polycarbonate, polyester, polyestercarbonate and polyarylate. It is preferable in this case that the content of the polycarbonate resin of the present invention in the blend is not less than 1% by weight.

The polycarbonate resin of the present invention can also be used for other applications than an electrophotographic photoreceptor. It can be blended with other resins such as other polycarbonate, polyester, polystyrene, polyamide, polyurethane, silicone, polymethylmethacrylate, polyoxyphenylene and polyvinyl acetate for property modification. It is preferable in this case that the content of the polycarbonate resin of the present invention in the blend is not less than 1% by weight. Furthermore, additives such as various antioxidants, mold release agents, ultraviolet absorbers, dyes, pigments, glass fiber and the like can be used in combination.

EXAMPLES

The present invention will be described in more detail below, referring to examples of the present invention with comparative examples, which are not intended to limit the scope of the present invention. In the following examples and comparative examples, "m" and "n" in the chemical formulas each represents an average polymerization degree.

Example of Synthesis 1

Synthesis of Polysiloxanebisphenol (S1)

36.6 g (0.1 mol) of 1,1-bis(4-hydroxy-3-methylphenyl)-10-undecene, manufactured by API Corporation (hereinafter, "BUD1"), 150 g of toluene and 0.10 g of a toluene solution of platinum-vinyl siloxane complex containing 1% by weight of platinum were charged into a separable flask of 500 ml and then the temperature of the mixture was raised to 80° C.

234 g (approximately 0.1 mol) of single-terminal hydrogen dimethylsiloxane represented by the following chemical formula (a) (hereinafter, "SH1") was dropped into the mixture. Then, after the dropping was completed, the reaction was conducted at 110° C. for 3 hours. After the reaction was completed, toluene was removed by vacuum distillation to obtain an objective compound represented by the following chemical formula (b) (hereinafter, "S1"). The objective compound was in a paste form and its hydroxyl equivalent was 42 KOHmg/g at 25° C.

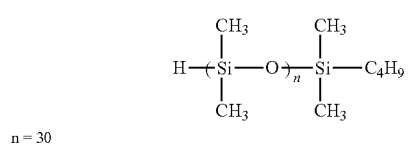

(a)

n = 30

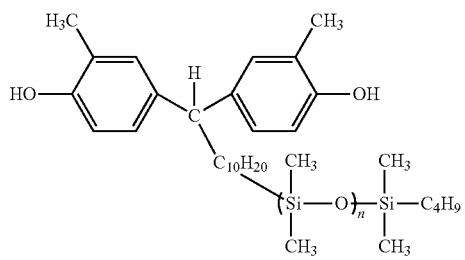

(b)

n = 30

Example of Synthesis 2

Synthesis of Polysiloxanebisphenol (S2)

Synthesis was conducted in the same manner as in Example of Synthesis 1 except for using 123 g (approximately 0.1 mol) of single-terminal hydrogen dimethylsiloxane represented by the following chemical formula (c) (hereinafter, "SH2") in place of SH1 to obtain an objective compound represented by the following chemical formula (d) (hereinafter, "S2"). The objective compound was in a paste form and its hydroxyl equivalent was 70 KOHmg/g at 25° C.

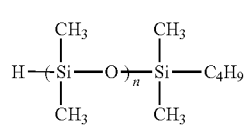

(c)

n = 15

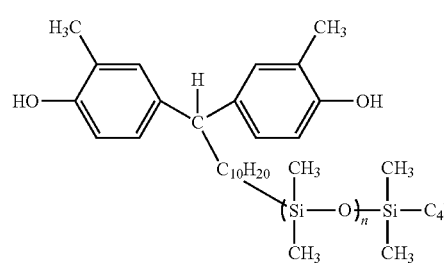

(d)

n = 15

Example of Synthesis 3

Synthesis of Polysiloxanebisphenol (S3)

Synthesis was conducted in the same manner as in Example of Synthesis 1 except for using 33.8 g (0.1 mol) of 1,1-bis(4-hydroxyphenyl)-10-undecene, manufactured by API Corporation (hereinafter, "BUD2") in place of BUD1 and 358 g (approximately 0.1 mol) of single-terminal hydrogen dimethyldiphenylsiloxane represented by the following chemical formula (e) (hereinafter, "SH3") in place of SH1 to obtain an objective compound represented by the following chemical formula (f) (hereinafter, "S3"). The objective compound was in a paste form and its hydroxyl equivalent was 28 KOHmg/g at 25° C.

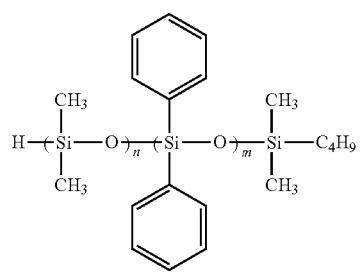

(e)

n:m = 20:10
(n + m) = 30

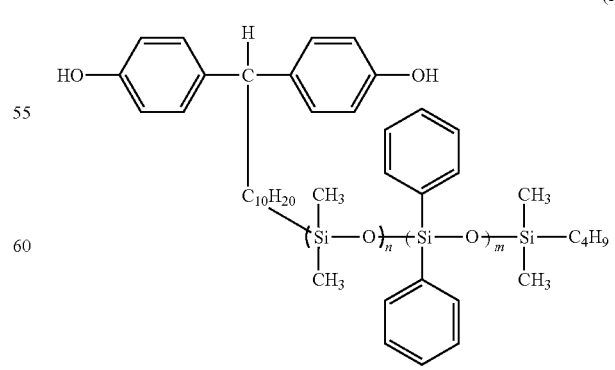

(f)

n:m = 20:10
(n + m) = 30

Example of Synthesis 4

Synthesis of Polysiloxanebisphenol (S4)

Synthesis was conducted in the same manner as in Example of Synthesis 1 except for using 47.8 g (0.1 mol) of 1,1-bis(4-hydroxy-3-t-butyl-6-methylphenyl)-10-undecene, manufactured by API Corporation (hereinafter, "BUD3") in place of BUD1 to obtain an objective compound represented by the following chemical formula (g) (hereinafter, "S4"). The objective compound was in a paste form and its hydroxyl equivalent was 41 KOHmg/g at 25° C.

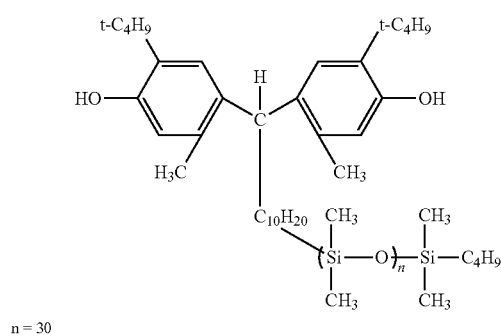

(g)

n = 30

Example of Synthesis 5

Synthesis of Polysiloxanebisphenol (S5)

Synthesis was conducted in the same manner as in Example of Synthesis 1 except for using 49.0 g (0.1 mol) of 1,1-bis(4-hydroxy-3-phenylphenyl)-10-undecene, manufactured by API Corporation (hereinafter, "BUD4") in place of BUD1 to obtain an objective compound represented by the following chemical formula (h) (hereinafter, "S5"). The objective compound was in a paste form and its hydroxyl equivalent was 40 KOHmg/g at 25° C.

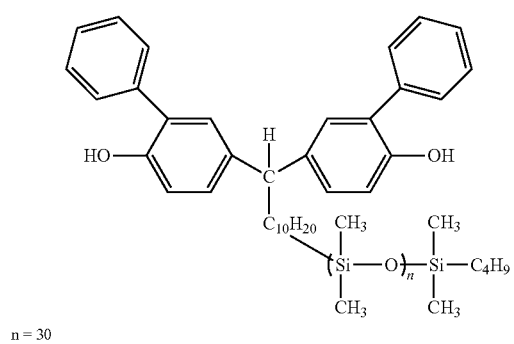

(h)

n = 30

Example of Synthesis 6

Synthesis of Polysiloxanebisphenol (S7)

Synthesis was conducted in the same manner as in Example of Synthesis 1 except for using 15.4 g (0.05 mol) of 2,2-bis(4-hydroxy-3-allylphenyl)propane, manufactured by API Corporation (hereinafter, "DABPA") in place of BUD1 to obtain an objective compound represented by the following chemical formula (i) (hereinafter, "S7"). The objective compound was liquid and its hydroxyl equivalent was 22 KOHmg/g at 25° C.

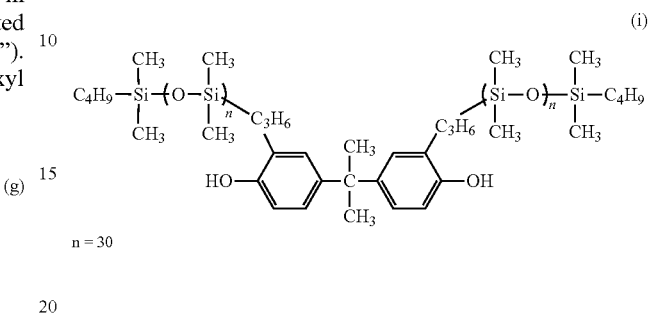

(i)

n = 30

Example 1

90 g (0.34 mol) of 1,1-bis(4-hydroxyphenyl)cyclohexane, manufactured by Honshu Chemical Industry Co., Ltd. in Japan (hereinafter, "BPZ"), 10 g of S1 synthesized in the above-mentioned Example of Synthesis 1 and 0.1 g of hydrosulfite were dissolved into 1100 ml of 5 w/w % aqueous solution of sodium hydroxide and agitated. 500 ml of methylene chloride was added to the aqueous solution and then, agitating the solution and keeping the temperature of the solution to 15° C., 55 g of phosgene was blown into the solution for 55 minutes.

After blowing of phosgene was completed, 1.42 g of p-t-butylphenol (hereinafter, "PTBP"), manufactured by Dainippon Ink And Chemicals, Inc., was added as a molecular weight adjuster and the solution was agitated intensely to emulsify the reaction solution. After the solution was emulsified, 0.4 ml of triethylamine was added and the emulsion was agitated at 20 to 25° C. for about 1 hour for the purpose of polymerization.

After the completion of the polymerization, the reaction solution was separated into an aqueous phase and an organic phase. The organic phase was neutralized by phosphoric acid and was washed repeatedly with water until the electric conductivity of the upper solution (aqueous phase) falls not higher than 10 μS/cm. The obtained polymer solution was dropped into warm water keeping at 45° C., and then the solvent was removed by evaporation to obtain a white powdery precipitate. The obtained precipitate was filtered and dried at 105° C. for 24 hours to obtain a powdery polymer.

The obtained polymer was analyzed by means of infrared absorption spectrometry. As a result, the absorption due to a carbonyl group was observed at a position near 1,770 cm$^{-1}$ and the absorption due to an ether bond was observed at a position near 1,240 cm$^{-1}$. Thus, it was confirmed that the polymer was a polycarbonate resin having a carbonate bond. In addition, the absorption due to a siloxane group near 1100 to 1020 cm$^{-1}$ was also observed. On the other hand, the absorption due to a hydroxy group near 3650 to 3200 cm$^{-1}$ was scarcely observed. According to these results of infrared absorption spectrometry, the obtained polymer was assumed to be a polycarbonate polymer represented by the following chemical formula (j) (hereinafter, "PC1").

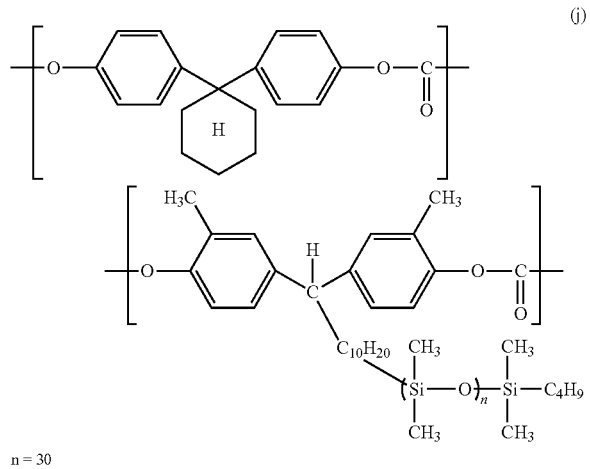

n = 30

The viscosity-average molecular weight of this polymer measured by a capillary viscometry was 21,000.

A solution was prepared by blending 50 parts by weight of the above polymer (PC1), 300 parts by weight of tetrahydrofuran and 50 parts by weight of toluene. Then, a film having the thickness of approximately 20 μm was formed by casting the solution. The obtained film was dried in air, and then after drying at 105° C. for 8 hours, coefficient of static friction of the film surface was measured by a tribometer.

Thereafter, a coating solution was prepared by blending 50 parts by weight of N,N'-bis(3-methylphenyl)-N,N'-bis(phenyl)benzidine, manufactured by SYNTEC (hereinafter, "TPD type CT agent"), 50 parts by weight of the above-mentioned PC1, 300 parts by weight of tetrahydrofuran and 50 parts by weight of toluene. The coating solution thus obtained was coated by a dip coating method onto a commercially available LBP photoreceptor (LPA3ETC4: tradename, manufactured by Seiko Epson Corp.) from which the charge transport layer had been removed in advance by tetrahydrofuran. The coated film was dried in air and then dried at 100° C. for 8 hours to form a charge transport layer having the thickness of approximately 20 μm. Thus, a multilayer electrophotographic photoreceptor (hereinafter, "OPC") having an approximately 20 μm-thick charge transport layer was produced.

The prepared OPC was then mounted in a commercially available a laser beam printer (LBP-8400: tradename, manufactured by Seiko Epson Corp.). The laser beam printer was driven continuously to print an entirely black solid image on 5,000 sheets of recycled OA paper (LBP-190R-A4B, manufactured by Tochiman Co., Ltd.) and the abraded amount of the photoreceptor after printing was measured. The results are shown in Table 1.

Example 2

A polycarbonate resin was synthesized in the same manner as in Example 1 except for using 36 g (0.16 mol) of 2,2-bis(4-hydroxyphenyl)propane (hereinafter, "BPA"), manufactured by Mitsui Chemical, Inc., and 54 g (0.21 mol) of 2,2-bis(4-hydroxy-3-methylphenyl)propane (hereinafter, "BPC"), manufactured by Honshu Chemical Industry Co., Ltd., in place of BPZ.

According to the results of infrared absorption spectrometry, the obtained polymer was assumed to be a polycarbonate polymer represented by the following chemical formula (k) (hereinafter, "PC2").

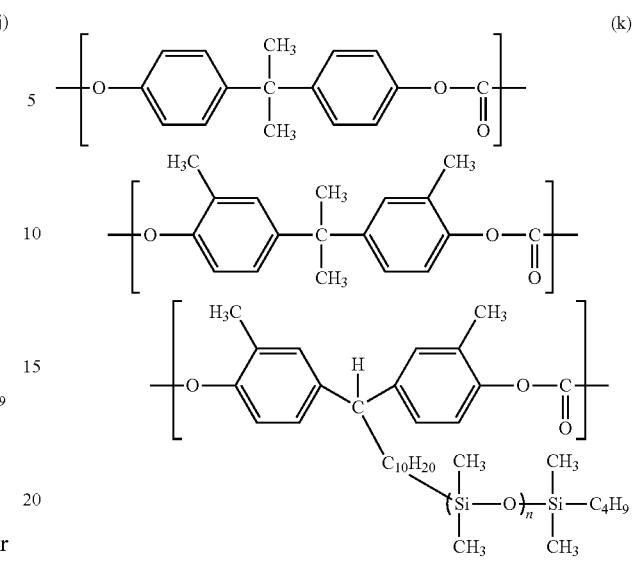

n = 30

The viscosity-average molecular weight of this polymer was 29,000. Evaluations of coefficient of static friction and abrasion resistance were conducted in the same manner as in Example 1 using PC2 in place of PC1. The results are shown in Table 1.

Example 3

A polycarbonate resin was synthesized in the same manner as in Example 1 except for using 27 g (0.13 mol) of bis(4-hydroxyphenyl) ether (hereinafter, "DHPE"), manufactured by Dainippon Ink And Chemicals, Inc., and 63 g (0.29 mol) of 1,1-bis(4-hydroxyphenyl)ethane (hereinafter, "BPE"), manufactured by Honshu Chemical Industry Co., Ltd., in place of BPZ.

According to the results of infrared absorption spectrometry, the obtained polymer was assumed to be a polycarbonate polymer represented by the following chemical formula (1) (hereinafter, "PC3").

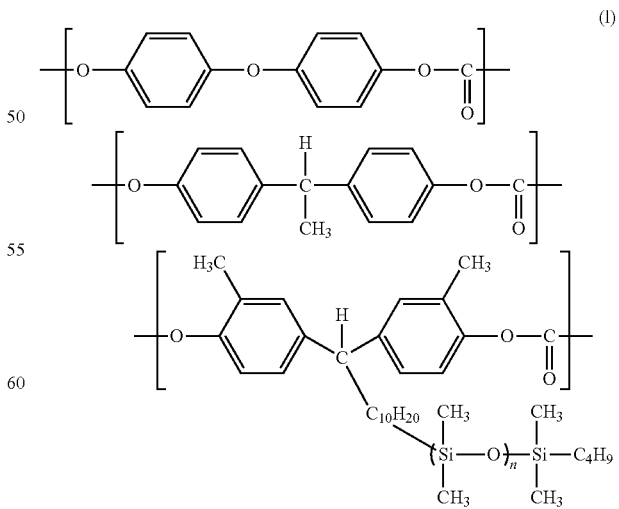

n = 30

The viscosity-average molecular weight of this polymer was 32,000. Evaluations of coefficient of static friction and abrasion resistance were conducted in the same manner as in Example 1 using PC3 in place of PC1. The results are shown in Table 1.

Example 4

A polycarbonate resin was synthesized in the same manner as in Example 1 except for using 13.5 g (0.07 mol) of 1,1'-biphenyl-4,4'-diol (hereinafter, "BP"), manufactured by Honshu Chemical Industry Co., Ltd., and 76.5 g (0.29 mol) of 1,1-bis(4-hydroxyphenyl)-1-phenylethane (hereinafter, "BPAP"), manufactured by Honshu Chemical Industry Co., Ltd., in place of BPZ.

According to the results of infrared absorption spectrometry, the obtained polymer was assumed to be a polycarbonate polymer represented by the following chemical formula (m) (hereinafter, "PC4").

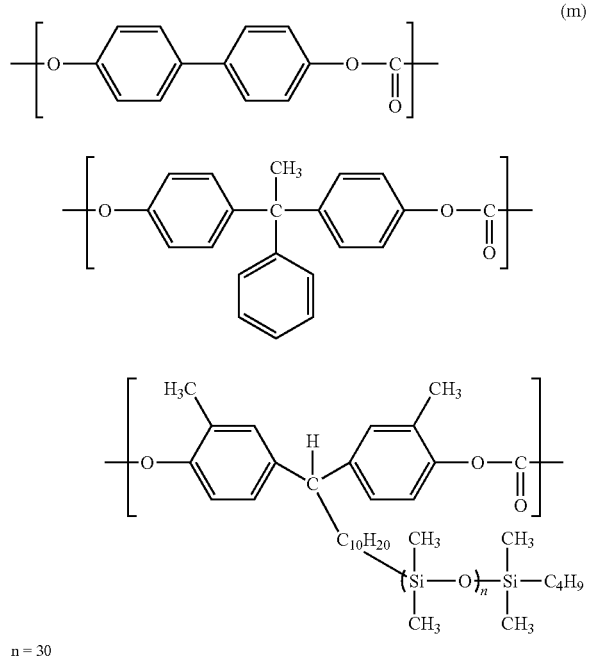

n = 30

The viscosity-average molecular weight of this polymer was 20,000. Evaluations of coefficient of static friction and abrasion resistance were conducted in the same manner as in Example 1 using PC4 in place of PC1. The results are shown in Table 1.

Example 5

A polycarbonate resin was synthesized in the same manner as in Example 1 except for using 22 g of S2 in place of S1.

According to the results of infrared absorption spectrometry, the obtained polymer was assumed to be a polycarbonate polymer represented by the following chemical formula (n) (hereinafter, "PC5").

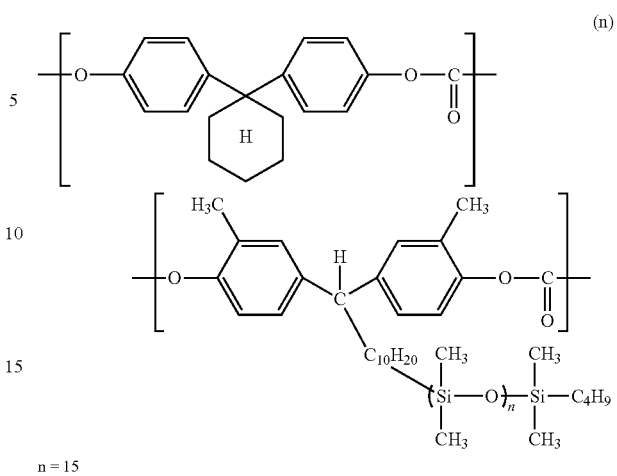

n = 15

The viscosity-average molecular weight of this polymer was 22,000. Evaluations of coefficient of static friction and abrasion resistance were conducted in the same manner as in Example 1 using PC5 in place of PC1. The results are shown in Table 1.

Example 6

A polycarbonate resin was synthesized in the same manner as in Example 1 except for using S3 in place of S1 and changing the amount of PTBT to 0.71 g.

According to the results of infrared absorption spectrometry, the obtained polymer was assumed to be a polycarbonate polymer represented by the following chemical formula (o) (hereinafter, "PC6").

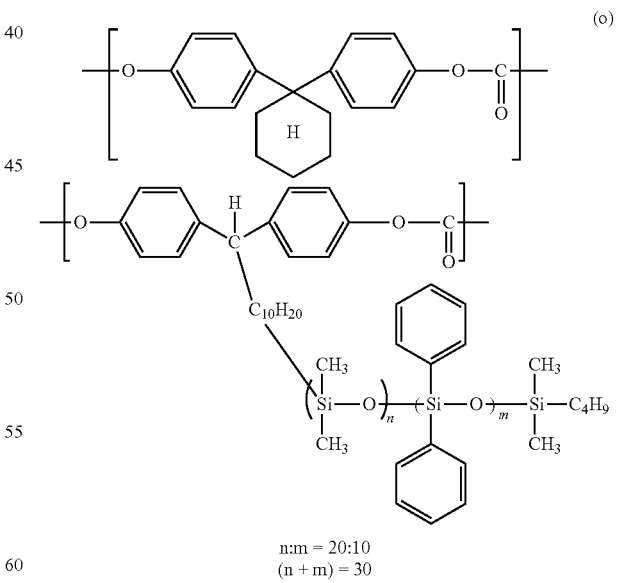

n:m = 20:10
(n + m) = 30

The viscosity-average molecular weight of this polymer was 38,000. Evaluations of coefficient of static friction and abrasion resistance were conducted in the same manner as in Example 1 using PC6 in place of PC1. The results are shown in Table 1.

Example 7

A polycarbonate resin was synthesized in the same manner as in Example 1 except for using S4 in place of S1.

According to the results of infrared absorption spectrometry, the obtained polymer was assumed to be a polycarbonate polymer represented by the following chemical formula (p) (hereinafter, "PC7")

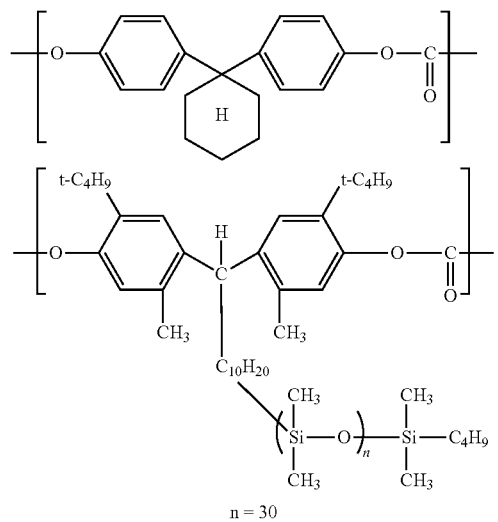

(p)

n = 30

The viscosity-average molecular weight of this polymer was 20,000. Evaluations of coefficient of static friction and abrasion resistance were conducted in the same manner as in Example 1 using PC7 in place of PC1. The results are shown in Table 1.

Example 8

A polycarbonate resin was synthesized in the same manner as in Example 1 except for using S5 in place of S1.

According to the results of infrared absorption spectrometry, the obtained polymer was assumed to be a polycarbonate polymer represented by the following chemical formula (q) (hereinafter, "PC8")

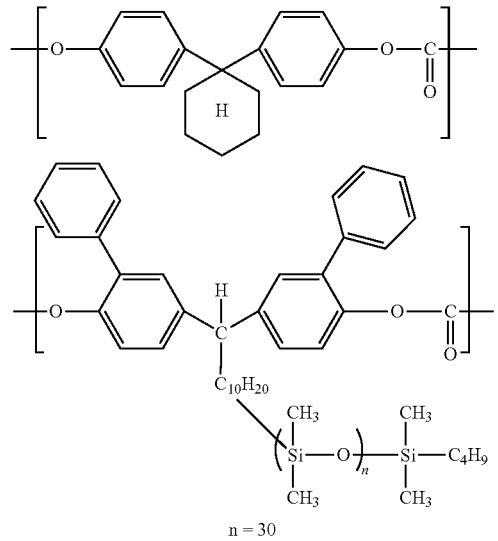

(q)

n = 30

The viscosity-average molecular weight of this polymer was 20,000. Evaluations of coefficient of static friction and abrasion resistance were conducted in the same manner as in Example 1 using PC8 in place of PC1. The results are shown in Table 1.

Example 9

Evaluations of coefficient of static friction and abrasion resistance were conducted in the same manner as in Example 1 except for using 25 parts by weight of PC1 and 25 parts by weight of BPZ type homopolycarbonate resin (PCZ-200: trade name, manufactured by Mitsubishi Gas Chemical Co., Inc., viscosity-average molecular weight: 21,000) that is a commercially available binder resin for electrophotographic photoreceptors in place of using 50 parts by weight of PC1 independently. The results are shown in Table 1.

Comparative Example 1

Evaluations of coefficient of static friction and abrasion resistance were conducted in the same manner as in Example 1 except for using BPZ type homopolycarbonate resin (the above-mentioned "PCZ-200") in place of PC1. The results are shown in Table 1.

Comparative Example 2

A polycarbonate resin was synthesized in the same manner as in Example 1 except for using a polysiloxane compound represented by the following chemical formula (r) (trade name; "X-22-1821", manufactured by Shin-Etsu Chemical Co., Inc., hereinafter "S6") in place of S1.

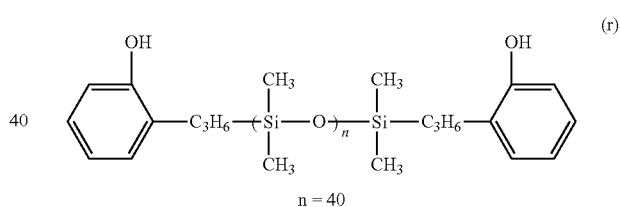

(r)

n = 40

According to the results of infrared absorption spectrometry, the obtained polymer was assumed to be a polycarbonate polymer represented by the following chemical formula (s) (hereinafter, "PC9")

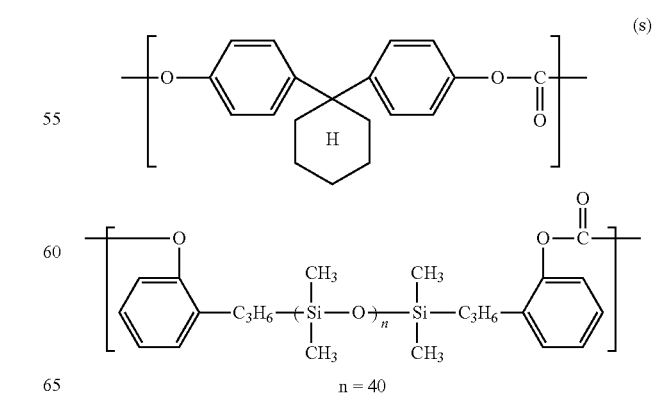

(s)

n = 40

The viscosity-average molecular weight of this polymer was 21,000. Evaluations of coefficient of static friction and abrasion resistance were conducted in the same manner as in Example 1 using PC9 in place of PC1. The results are shown in Table 1.

Comparative Example 3

A polycarbonate resin was synthesized in the same manner as in Example 1 except for using S7 in place of S1. According to the results of infrared absorption spectrometry, the obtained polymer was assumed to be a polycarbonate polymer represented by the following chemical formula (t) (hereinafter, "PC10").

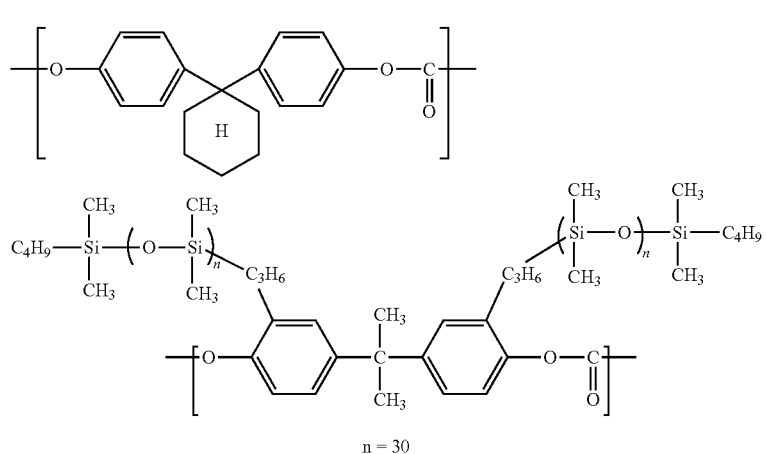

(t)

The viscosity-average molecular weight of this polymer was 21,000. Evaluations of coefficient of static friction and abrasion resistance were conducted in the same manner as in Example 1 using PC10 in place of PC1. The results are shown in Table 1.

In the above Table 1, each numerical value and symbol represent the following meanings:

"% by weight"; The ratio of the bisphenol represented by the general formula (1') based upon the total amount of bisphenols used for synthesizing the polycarbonate resin (% by weight)

"Polymer blended"; 50% by weight of "PCZ-200" added with PC1 in Example 9.

"Viscosity-average molecular weight"; obtained by firstly determining a limiting viscosity $[\eta]$ by a capillary viscometry using a Ubbelohde's viscometer under the condition of 20° C. in a dichloromethane solution of 0.005 g/ml with a Haggins constant of 0.45, and then calculating by a calculating formula $[\eta]=1.23\times10^{-4}M^{0.83}$.

"Coefficient of static friction"; determined by measuring a polycarbonate film on a glass substrate by a tribometer (HEIDON Tribogear Muse; trade name, manufactured by Shinto Scientific CO.,LTD.).

"Abraded amount"; determined by measuring a loss of weight (mg) of a photoreceptor (OPC) after continuously printing an entirely black solid image on 5,000 A4 size sheets of paper using LBP(LBP-8400: trade name, manufactured by Seiko Epson Corp.).

TABLE 1

| | General formula (1') | | General formula (2') | | Viscosity-average | | Coefficient of | Abraded amount |
|---|---|---|---|---|---|---|---|---|
| | Monomer | % by weight | Monomer | | molecular weight | Polymer blended | static friction | (mg) |
| Example | | | | | | | | |
| 1 | S1 | 10 | BPZ | | 21,000 | | 0.070 | 17 |
| 2 | S1 | 10 | BPA | BPC | 29,000 | | 0.072 | 19 |
| 3 | S1 | 10 | DHPE | BPE | 32,000 | | 0.067 | 14 |
| 4 | S1 | 10 | BP | BPAP | 29,000 | | 0.074 | 20 |
| 5 | S2 | 20 | BPZ | | 22,000 | | 0.054 | 14 |
| 6 | S3 | 10 | BPZ | | 38,000 | | 0.077 | 16 |
| 7 | S4 | 10 | BPZ | | 20,000 | | 0.071 | 20 |
| 8 | S5 | 10 | BPZ | | 20,000 | | 0.068 | 18 |
| 9 | S1 | 10 | BPZ | | 21,000 | PCZ (50%) | 0.080 | 21 |
| Com. Example | | | | | | | | |
| 1 | | | BPZ | | 21,000 | | 0.431 | 76 |
| 2 | S6 | 10 | BPZ | | 21,000 | | 0.179 | 39 |
| 3 | S7 | 10 | BPZ | | 21,000 | | 0.108 | 30 |

The polycarbonate resin according to the present invention has excellent lubricity and abrasion resistance. Therefore, it can suitably be used as a binder resin for an electrophotographic photoreceptor.

What is claimed is:

1. A polycarbonate resin having a viscosity-average molecular weight of 12,000 to 100,000 which is composed mainly by a structural unit represented by the following formula (1) and a structural unit represented by the following formula (2):

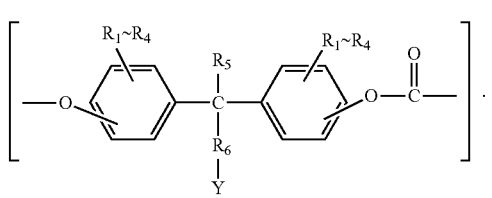

wherein:
$R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents;
$R_6$ represents an alkylene group having 1 to 20 carbon atoms which may have substituents; and
Y represents a group selected from the following groups:

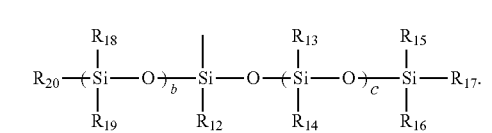

wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents; and
"a", "b", and "c" each represents an integer of not less than 1;

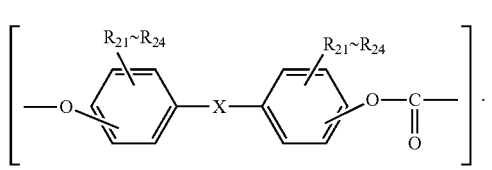

wherein:
$R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents; and
X represents a group selected from the following groups:

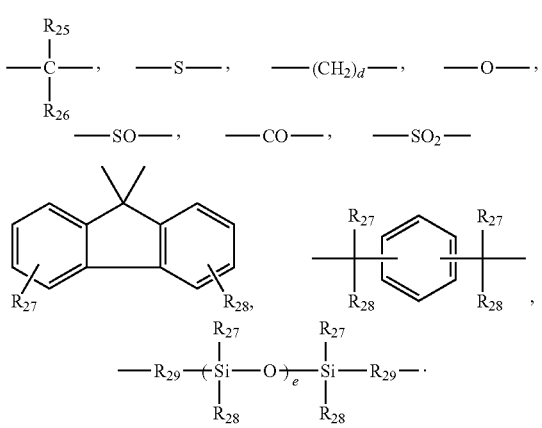

wherein:
$R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements;
$R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents;
$R_{29}$ represents an alkylene group having 1 to 9 carbon atoms which may have substituents;
"d" represents an integer of 0 to 20; and
"e" represents an integer of 1 to 500.

2. The polycarbonate resin according to claim 1, wherein $R_6$ in the formula (1) represents an alkylene group having 4 to 20 carbon atoms.

3. The polycarbonate resin according to claim 1, wherein "a", "b", and "c" in the formula (1) each represents an integer of 1 to 200.

4. The polycarbonate resin according to claim 1, wherein $R_7$ to $R_{20}$ in the formula (1) each represents a methyl group or a phenyl group.

5. The polycarbonate resin according to claim 1, wherein $R_1$ to $R_4$ in the formula (1) each represents a group selected from the group consisting of hydrogen, a methyl group, a butyl group and a phenyl group.

6. The polycarbonate resin according to claim 1, wherein the ratio of the structural unit represented by the formula (1) and the structural unit represented by the formula (2) is (1):(2)=0.1-70:99.9-30 in a weight ratio.

7. The polycarbonate resin according to claim 2, wherein "a", "b", and "c" in the formula (1) each represents an integer of 1 to 200.

8. The polycarbonate resin according to claim 2, wherein $R_7$ to $R_{20}$ in the formula (1) each represents a methyl group or a phenyl group.

9. The polycarbonate resin according to claim 2, wherein $R_1$ to $R_4$ in the formula (1) each represents a group selected from the group consisting of hydrogen, a methyl group, a butyl group and a phenyl group.

10. The polycarbonate resin according to claim 2, wherein the ratio of the structural unit represented by the formula (1) and the structural unit represented by the formula (2) is (1):(2)=0.1-70:99.9-30 in a weight ratio.

11. A process for producing the polycarbonate resin according to claim 1, which comprises a step of reacting bisphenol represented by the following formula (1') and bisphenol represented by the following formula (2') with a carbonate-forming compound;

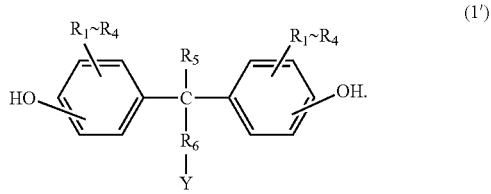

(1')

wherein:
$R_1$ to $R_5$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents;
$R_6$ represents an alkylene group having 1 to 20 carbon atoms which may have substituents; and
Y represents a group selected from the following groups:

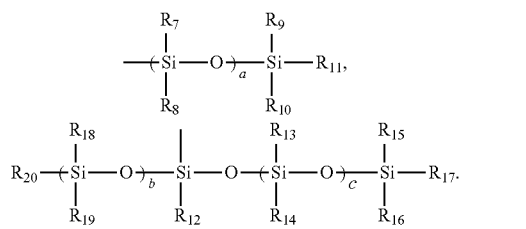

wherein $R_7$ to $R_{20}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkoxy group having 1 to 5 carbon atoms which may have substituents and an aralkyl group having 7 to 17 carbon atoms which may have substituents; and "a", "b", and "c" each represents an integer of not less than 1;

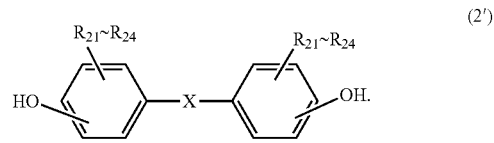

(2')

wherein:
$R_{21}$ to $R_{24}$ each independently represents a group selected from the group consisting of hydrogen, fluorine, chlorine, bromine, iodine, an alkyl group having 1 to 20 carbon atoms which may have substituents, an aryl group having 6 to 12 carbon atoms which may have substituents, an alkenyl group having 2 to 12 carbon atoms which may have substituents, an alkoxy group having 1 to 5 carbon atoms which may have substituents and an aralkyl group having 7 to 17 carbon atoms which may have substituents; and
X represents a group selected from the following groups:

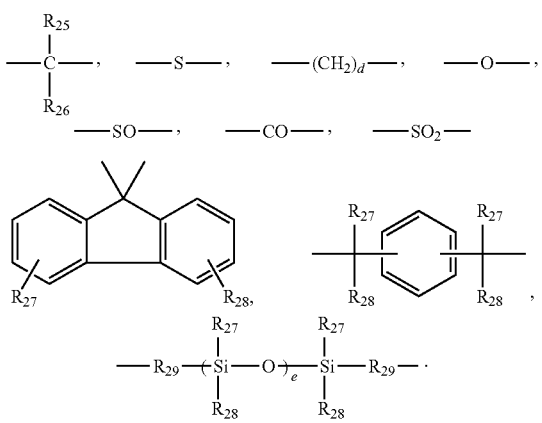

wherein:
$R_{25}$ and $R_{26}$ each independently represents a group selected from the group consisting of hydrogen, fluorine, chlorine, bromine, iodine, an alkyl group having 1 to 20 carbon atoms which may have substituents, an alkoxy group having 1 to 5 carbon atoms which may have substituents, an aryl group having 6 to 12 carbon atoms which may have substituents, or $R_{25}$ and $R_{26}$ may be combined with each other to represent as a whole a group forming a carbon ring of 5 to 20 carbon atoms or a heterocyclic ring of 5 to 12 elements;
$R_{27}$ and $R_{28}$ each independently represents a group selected from the group consisting of hydrogen, fluorine, chlorine, bromine, iodine, an alkyl group having 1 to 9 carbon atoms which may have substituents, an alkoxy group having 1 to 5 carbon atoms which may have substituents, an alkenyl group having 2 to 12 carbon atoms which may have substituents, and an aryl group having 6 to 12 carbon atoms which may have substituents;
$R_{29}$ represents an alkylene group having 1 to 9 carbon atoms which may have substituents;
"d" represents an integer of 0 to 20; and
"e" represents an integer of 1 to 500.

12. The process for producing a polycarbonate resin according to claim 11, wherein said bisphenol represented by the formula (1') is selected from the group consisting of the compounds represented by following structures:

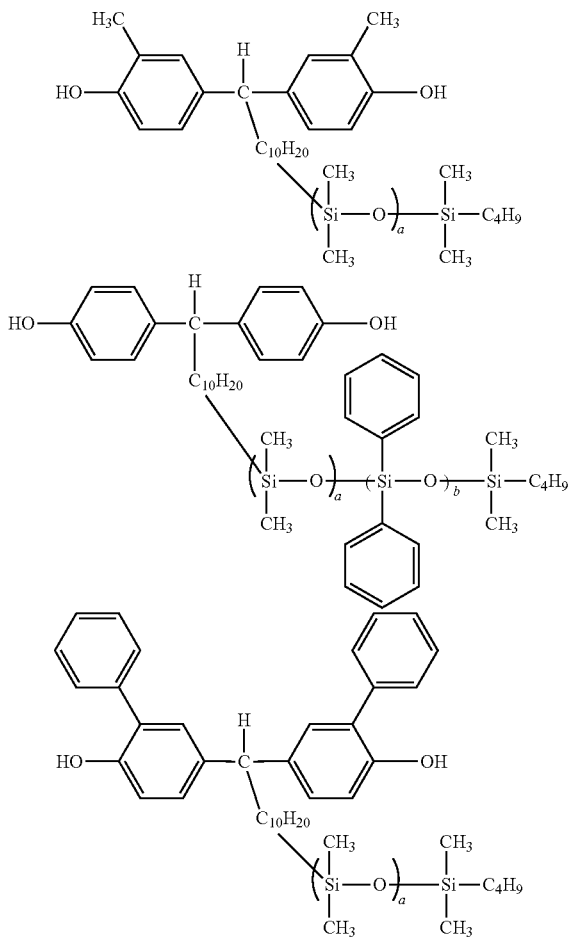

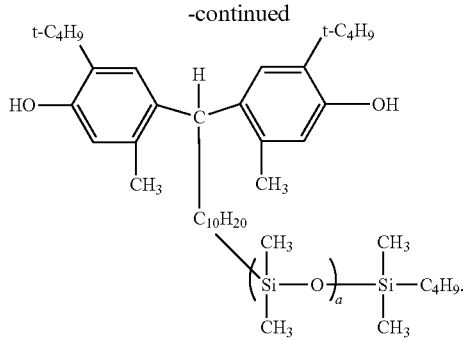

13. The process for producing a polycarbonate resin according to claim 11, wherein said bisphenol represented by the formula (2') is selected from the group consisting of 2,2-bis(4-hydroxyphenyl)propane, 2,2-bis(4-hydroxy-3-methylphenyl) propane, bis(4-hydroxyphenyl)ether, 1,1-bis(4-hydroxyphenyl)cyclohexane, 1,1-bis(4-hydroxyphenyl)-1-phenylethane, 1,1-bis(4-hydroxyphenyl)ethane, and 1,1'-biphenyl-4,4'-diol.

14. The process for producing a polycarbonate resin according to claim 11, wherein said carbonate-forming compound is phosgene.

15. The process for producing a polycarbonate resin according to claim 11, wherein the proportion of the bisphenol represented by the formula (1') is 0.1 to 60% by weight based upon the total amount of bisphenol used.

16. An electrophotographic photoreceptor using the polycarbonate resin according to claim 1 as a binder resin of a charge transport layer thereof.

17. An electrophotographic photoreceptor using the polycarbonate resin according to claim 2 as a binder resin of a charge transport layer thereof.

* * * * *